/ 12) United States Patent
Richter et al.

(10) Patent No.: US 10,633,516 B2
(45) Date of Patent: Apr. 28, 2020

(54) POLYAMIDE COMPOSITIONS HAVING IMPROVED OPTICAL PROPERTIES

(71) Applicant: BASF SE, Ludwigshafen am Rhein (DE)

(72) Inventors: Florian Richter, Mannheim (DE); Rainer Xalter, Heidelberg (DE); Hye Jin Park, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 164 days.

(21) Appl. No.: 15/744,108

(22) PCT Filed: Jul. 13, 2016

(86) PCT No.: PCT/EP2016/066582
§ 371 (c)(1),
(2) Date: Jan. 12, 2018

(87) PCT Pub. No.: WO2017/009357
PCT Pub. Date: Jan. 19, 2017

(65) Prior Publication Data
US 2018/0201758 A1    Jul. 19, 2018

(30) Foreign Application Priority Data

Jul. 15, 2015    (EP) .................................... 15176751

(51) Int. Cl.
*C08K 5/205* (2006.01)
*C08K 5/21* (2006.01)
(Continued)

(52) U.S. Cl.
CPC ............... *C08K 5/205* (2013.01); *C08K 5/21* (2013.01); *C08K 7/06* (2013.01); *C08K 7/14* (2013.01);
(Continued)

(58) Field of Classification Search
CPC . C08K 5/205; C08K 5/21; C08K 7/06; C08K 7/14; C08L 77/02; C08L 77/06
(Continued)

(56) References Cited

U.S. PATENT DOCUMENTS 3,359,227 A * 12/1967 Bader .................... C08G 69/18
524/723
8,999,086 B2    4/2015 Bollmann et al.
(Continued)

FOREIGN PATENT DOCUMENTS

CA        2341113 A1    11/2001
CN       104508008 A     4/2015
(Continued)

OTHER PUBLICATIONS

International Application No. PCT/EP2016/066582, International Search Report and Written Opinion, dated Sep. 22, 2016.
(Continued)

Primary Examiner — Hui H Chin
(74) Attorney, Agent, or Firm — Marshall, Gerstein & Borun LLP

(57) ABSTRACT

The invention relates to the use of thermoplastic molding compositions comprising
A) 30 to 99.99 wt % of a thermoplastic polyamide,
B) 0.01 to 10 wt % of a compound of formula I

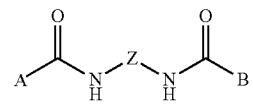

where
A) represents a

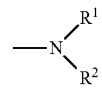

or —O—$R^5$ radical or

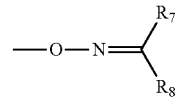

B) represents a

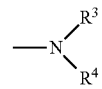

or —O—$R^6$ radical or

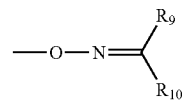

and
Z represents linear or branched C1 to C14 alkylene radicals, unsubstituted or substituted cycloalkylene radicals having 3 to 17 carbon atoms, substituted or unsubstituted aromatic radicals having 6 to 20 carbon atoms,
$R^1$ to $R^{10}$ independently of one another represent linear C1-C14 alkyl radicals, branched C3 to C12 alkyl radicals, unsubstituted or substituted C3-C14 cycloalkyl radicals, unsubstituted or substituted aromatic radicals having 6 to 20 carbon atoms or acetyl radicals,
$R^1$ and $R^2$ and also $R^3$ and $R^4$ independently of one another, together with the nitrogen as a linking member, form a heteroalkylene radical which may bear one or two keto groups as substituent(s).

10 Claims, No Drawings

(51) Int. Cl.
  *C08L 77/02* (2006.01)
  *C08L 77/06* (2006.01)
  *C08L 21/00* (2006.01)
  *C08K 7/06* (2006.01)
  *C08K 7/14* (2006.01)

(52) U.S. Cl.
  CPC .............. *C08L 21/00* (2013.01); *C08L 77/02* (2013.01); *C08L 77/06* (2013.01)

(58) Field of Classification Search
  USPC ........................................................ 524/198
  See application file for complete search history.

(56) References Cited

U.S. PATENT DOCUMENTS

| | | |
|---|---|---|
| 2004/0254280 A1 | 12/2004 | Richter et al. |
| 2005/0143548 A1* | 6/2005 | Loontjens .......... C08G 18/0895 528/44 |
| 2014/0142274 A1 | 5/2014 | Desbois et al. |
| 2015/0203631 A1 | 7/2015 | Miyazaki et al. |

FOREIGN PATENT DOCUMENTS

| | | | |
|---|---|---|---|
| GB | 1089360 A * | 11/1967 | ............. B29C 43/22 |
| WO | WO-03/035745 A1 | 5/2003 | |
| WO | WO-2009/027231 A1 | 3/2009 | |
| WO | WO-2013/004645 A1 | 1/2013 | |
| WO | WO-2013/139802 A1 | 9/2013 | |

OTHER PUBLICATIONS

International Application No. PCT/EP2016/066582, International Preliminary Report on Patentability, dated Sep. 29, 2017.

* cited by examiner

POLYAMIDE COMPOSITIONS HAVING IMPROVED OPTICAL PROPERTIES

CROSS-REFERENCE TO RELATED APPLICATIONS

This application is the U.S. National Phase of PCT/EP2016/066582, filed Jul. 13, 2016, which claims the benefit of European Patent Application No. 15176751.4, filed on Jul. 15, 2015.

The invention relates to the use of thermoplastic molding compositions comprising
A) 30 to 99.99 wt % of a thermoplastic polyamide,
B) 0.01 to 10 wt % of a compound of formula I

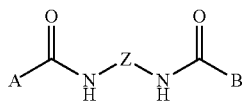

where the substituents have the following meanings:
A) represents

or —O—$R^5$ radical or

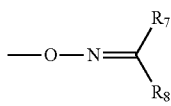

B) represents

or —O—$R^6$ radical or

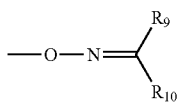

and
Z represents linear or branched C1 to C14 alkylene radicals, unsubstituted or substituted cycloalkylene radicals having 3 to 17 carbon atoms, substituted or unsubstituted aromatic radicals having 6 to 20 carbon atoms,
$R^1$ to $R^{10}$ independently of one another represent linear C1-C14 alkyl radicals, branched C3 to C12 alkyl radicals, unsubstituted or substituted C3-C14 cycloalkyl radicals, unsubstituted or substituted aromatic radicals having 6 to 20 carbon atoms or acetyl radicals,
$R^1$ and $R^2$ and also $R^3$ and $R^4$ independently of one another, together with the nitrogen as a linking member, form a heteroalkylene radical which may bear one or two keto groups as substituent(s),
C) 0 to 60 wt % of further additives,
wherein the weight percentages for the components A) to C) sum to 100%,
for producing molded articles of any type having improved haze (measured according to ASTM D1003) and/or improved clarity (measured according to ASTM D1003) and/or increased laser transparency (measured at a wavelength of 1064 nm using a thermoelectric power measurement).

The invention further relates to thermoplastic molding compositions and to the use for producing molded articles of any type having reduced cloudiness or improved clarity, in particular by laser transmission welding, and to the use of such molded articles in different fields of application.

Polyamides are employed in very different applications, for example for motor vehicles, electrical and electronic components and as packaging material for foodstuffs.

Sheets, films, containers, headlights and similar components require relatively high transparency (in particular laser transparency) and reduced cloudiness for certain fields of application.

WO 2013/139802 discloses using urea derivatives as additives for improving the optical properties of polyamides.

The use of substituted ureas as an activator for the anionic polymerization of caprolactam is disclosed, inter alia, in WO2013/4645. There is no mention of an improvement in optical properties.

It is accordingly an object of the present invention to improve the optical properties clarity and/or cloudiness and/or transparency (in particular laser transparency) in polyamides. Surprisingly, this object is achieved by addition of the inventive compounds of formula I to polyamides.

Accordingly, the use of the molding compositions which is defined at the outset has been found. Preferred embodiments are set out in the subclaims.

As component A) the molding competitions according to the invention comprise 30 to 99, preferably 30 to 98 and in particular 30 to 90 wt % of at least one polyamide.

The polyamides of the molding compositions according to the invention generally have a viscosity number of from 90 to 350 and preferably 110 to 240 ml/g determined in a 0.5 wt % solution in 96 wt % sulfuric acid at 25° C. in accordance with ISO 307.

Preference is given to semicrystalline or amorphous resins having a molecular weight (weight average) of at least 5000, such as are described in U.S. Pat. Nos. 2,071,250, 2,071,251, 2,130,523, 2,130,948, 2,241,322, 2,312,966, 2,512,606 and 3,393,210 for example.

Examples thereof include polyamides derived from lactams having 7 to 13 ring members, such as polycaprolactam, polycaprylolactam and polylaurolactam and also polyamides obtained by reacting dicarboxylic acids with diamines.

Usable as dicarboxylic acids are alkanedicarboxylic acids having 6 to 12 and in particular 6 to 10 carbon atoms and aromatic dicarboxylic acids. Mention will be made here only of adipic acid, azelaic acid, sebacic acid, dodecanedioic acid and terephthalic and/or isophthalic acid as acids.

Suitable diamines include in particular alkane diamines having 6 to 12 and in particular 6 to 8 carbon atoms and also m-xylylenediamine (for example Ultramid® X17 from BASF SE, a 1:1 molar ratio of MXDA with adipic acid), di-(4-aminophenyl)methane, di-(4-aminocyclohexyl)methane, 2,2-di-(4-aminophenyl)propane, 2,2-di-(4-aminocyclohexyl)propane and 1,5-diamino-2-methylpentane.

Preferred polyamides are polyhexamethylene adipamide, polyhexamethylene sebacamide and polycaprolactam and also copolyamides 6/66, especially with a proportion of caprolactam units of from 5 to 95 wt % of (for example Ultramid® C31 from BASF SE).

Further suitable polyamides are obtainable from ω-aminoalkyl nitriles, for example aminocapronitrile (PA 6) and adipodinitrile with hexamethylenediamine (PA 66) by so-called direct polymerization in the presence of water, as described in DE-A 10313681, EP-A 1198491 and EP 922065 for example.

Also useful are polyamides obtainable, for example, by condensation of 1,4-diaminobutane with adipic acid at elevated temperature (polyamide-4,6). Production processes for polyamides having this structure are described in EP-A 38 094, EP-A 38 582 and EP-A 39 524 for example.

Also suitable are polyamides obtainable by copolymerization of two or more of the abovementioned monomers or mixtures of a plurality of polyamides in any desired mixing ratio. Particular preference is given to mixtures of polyamide 66 with other polyamides, in particular copolyamides 6/66.

Furthermore, partially aromatic copolyamides such as PA 6/6T and PA 66/6T having a triamine content of less than 0.5 and preferably less than 0.3 wt % have proven particularly advantageous (see EP-A 299 444). Further high-temperature-resistant polyamides are disclosed in EP-A 19 94 075 (PA 6T/6I/MXD6).

The preferred partly aromatic copolyamides having a low triamine content may be produced by the processes described in EP-A 129 195 and 129 196.

The following nonexhaustive schedule contains the cited, and also additional, polyamides A) within the meaning of the invention and the monomers present.

AB Polymers:
PA 4 pyrrolidone
PA 6 δ-caprolactam
PA 7 ethanolactam
PA 8 caprylolactam
PA 9 9-aminopelargonic acid
PA 11 11-aminoundecanoic acid
PA 12 laurolactam AA/BB Polymers:
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 1,12-dodecanediamine, decanedicarboxylic acid
PA 1313 1,13-diaminotridecane, undecanedicarboxylic acid
PA 6T hexamethylenediamine, terephthalic acid
PA 9T 1,9-nonanediamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA6 and PA 610)
PA 6I/6T (see PA 6I and PA 6T)
PA PACM 12 diaminodicyclohexylmethane, laurolactam
PA 6I/6T/PACM as PA 6I/6T+diaminodicyclohexylmethane
PA 12/MACMI laurolactam, dimethyldiaminodicyclohexylmethane, isophthalic acid
PA 12/MACMT laurolactam, dimethyldiaminodicyclohexylmethane, terephthalic acid
PA PDA-T phenylenediamine, terephthalic acid As component B) the molding compositions usable in accordance with the invention comprise 0.01 to 10, preferably 0.05 to 5 and in particular 0.5 to 2 wt % of a compound of formula I

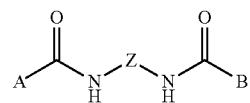

where
A) represents a

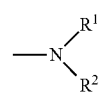

or —O—$R^5$ radical or

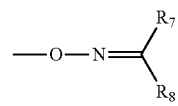

B) represents a

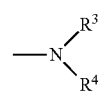

or —O—$R^6$ radical or

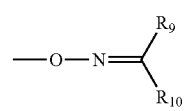

Z represents linear or branched C1 to C14 alkylene radicals, unsubstituted or substituted cycloalkylene radicals having 3 to 17 carbon atoms, substituted or unsubstituted aromatic radicals having 6 to 20 carbon atoms, $R^1$ to $R^{16}$ independently of one another represent linear C1-C14 alkyl radicals, branched C3 to C12 alkyl radicals, unsubstituted or substituted C3-C14 cycloalkyl radicals, unsubstituted or substituted aromatic radicals having 6 to 20 carbon atoms or acetyl radicals, $R^1$ and $R^2$ and also $R^3$ and $R^4$ independently of one another, together with the nitrogen as a linking member, form a heteroalkylene radical which may bear one or two keto groups as substituent(s).

Linear alkyl radicals $R^1$ to $R^6$ are to be understood as meaning unbranched alkyl chains having 1 to 14 and preferably 1 to 10 carbon atoms. Examples include methyl, ethyl, n-propyl, n-butyl, n-pentyl, n-hexyl, n-heptyl, n-octyl, n-nonyl and n-decyl.

For the acetyl radicals preference is given to combinations with
$R^1$ or $R^3$=methyl or phenyl, independently of one another, and
$R^2$ or $R^4$=,

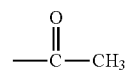

these being substituents derived from methylacetamide and/or acetanilide.

Alkyl radicals are to be understood as meaning alkyl chains with branching which have 3 to 12 and preferably 3 to 10 carbon atoms, in particular 1 to 4 carbon atoms.

Examples include: isopropyl, 2-butyl, isobutyl, tert-butyl, 1-methylbutyl, 2-methylbutyl, 3-methylbutyl, 2,2-dimethylpropyl, 1-ethylpropyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, 1-methylhexyl, 2-methylhexyl, 3-methylhexyl, 4-methylhexyl, 5-methylhexyl, 1-ethylpentyl, 2-ethylpentyl, 3-ethylpentyl, 1-methylheptyl, 2-methylheptyl, 3-methylheptyl, 4-methylheptyl, 5-methylheptyl, 1-propylpentyl, 1-ethylhexyl, 2-ethylhexyl, 3-ethylhexyl, 1-methyloctyl, 2-methylheptyl, 1-ethylhexyl, 2-ethylhexyl, 1,2-dimethylhexyl, 1-propylpentyl and 2-propylpentyl.

Examples of cycloalkyl radicals having 3 to 14 carbon atoms and preferably 3 to 10 carbon atoms include cyclopropyl, cyclobutyl, cyclopentyl, cyclohexyl, cycloheptyl, cyclooctyl, cyclononyl and cyclodecyl.

Substituted cycloalkyl radicals is to be understood as meaning in particular radicals which have a heteroatom, preferably nitrogen or oxygen, in the ring or can bear substituents such as one or more alkyl radicals having 1 to 4 carbon atoms.

An example of heterocycles is pyrrolidine.

Aromatic radicals having 6 to 20 and preferably 6 to 17 carbon atoms is to be understood as meaning aromatic ring systems such as phenol, naphthyl, anthracenyl or phenanthryl.

Such aromatic radicals may bear one or more substituents such as alkyl radicals (linear or branched, see above definition) having 1 to 10 and preferably 1 to 4 carbon atoms or halogen, preferably bromine or chlorine.

The aromatic radicals may also be linked to a further aromatic radical via alkylene bridges having 1 to 4 carbon atoms.

Further preferred radicals $R^1$ to $R^4$ are those where $R^1$ and $R^2$ and also $R^3$ and $R^4$ independently of one another, together with the nitrogen as a linking member, forms a heteroalkylene radical which has 3 to 14 carbon atoms, preferably 5 to 12 carbon atoms, and may bear one or 2 keto groups as substituent(s). Said keto group is in particular disposed in direct adjacency to the nitrogen atom, i.e. the nitrogen atom forms a lactam ring with the carbon atoms.

Examples of such radicals having one keto group include butyrolactam, Laurolactam and, with very particular preference, ε-caprolactam.

Further heterocycles are (the dashed line represents the bond to the remaining portion of compound I):

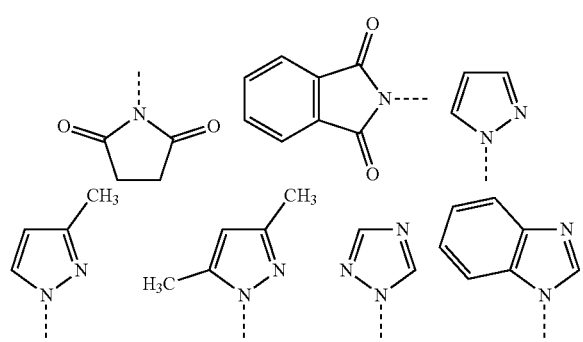

-continued

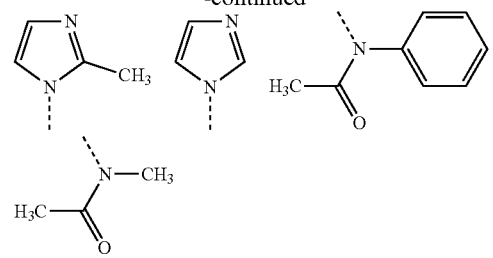

Preferred radicals $R^7$ to $R^{10}$ are independently of one another aromatic radicals having 6 to 12 and preferably 6 to 10 carbon atoms, wherein the compounds

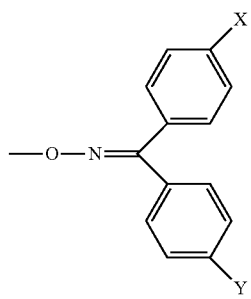

where
Y=H, X=H
Y=$NO_2$, X=H
Y=$CH_3$, X=H
Y=$OCH_3$, X=H
Y=$N(CH_3)_2$, X=H
and
Y=$N(CH_3)_2$, X=$N(CH_3)_2$
are preferred.

Production may be carried out as per E. Delebecq et al., Chemical Reviews 2013, 113, 80-118. It is further apparent from this article that all substituents A or B represent so-called protective groups for the nucleus Z, i.e. the operating principle depends on the nucleus Z.

Preferred radicals $R^1$ to $R^6$ are those where the radicals $R^1$ to $R^6$ independently of one another represent methyl, ethyl, n-propyl, phenyl or cyclohexyl or where the radicals $R^1$ and $R^2$ and also $R^3$ and $R^4$ as well as $R^5$ and $R^6$ are identical.

Preferred radicals Z are linear or branched C1 to C14 alkylene radicals, unsubstituted or substituted cycloalkylene radicals having 3 to 17 carbon atoms, substituted or unsubstituted aromatic radicals having 6 to 20 carbon atoms.

Preferred alkylene radicals (also known as alkanediyl radicals) have 1 to 10 carbon atoms. Examples include methylene, ethylene, propylene, butylene, pentamethylene, hexamethylene and heptamethylene.

Examples of branched alkylene chains are the radicals defined above which may bear one or more alkyl radicals having 1 to 4 carbon atoms.

Unsubstituted cycloalkylene radicals preferably have 3 to 14 carbon atoms and conform to the above definition of cycloalkyl radicals with the exception that a further hydrogen atom is replaced by a bond to form a bivalent unit (bivalent radical).

Examples include cyclohexylene, cyclopentylene.

Substituted cycloalkylene radicals may have heteroatoms such as nitrogen or oxygen in the ring or may bear one or more alkyl radicals having 1 to 4 carbon atoms. Such radicals may also be linked to a further cycloalkylene radical via alkylene bridges having 1 to 4 carbon atoms.

Substituted or unsubstituted aromatic radicals preferably having 6 to 17 carbon atoms is to be understood as meaning the abovementioned ring systems where a further hydrogen atom has been replaced by a chemical bond to form a divalent unit (also known as a divalent radical).

It is particularly preferable when Z represents a 1,4-trans-cyclohexylene radical.

Preferred compounds include:

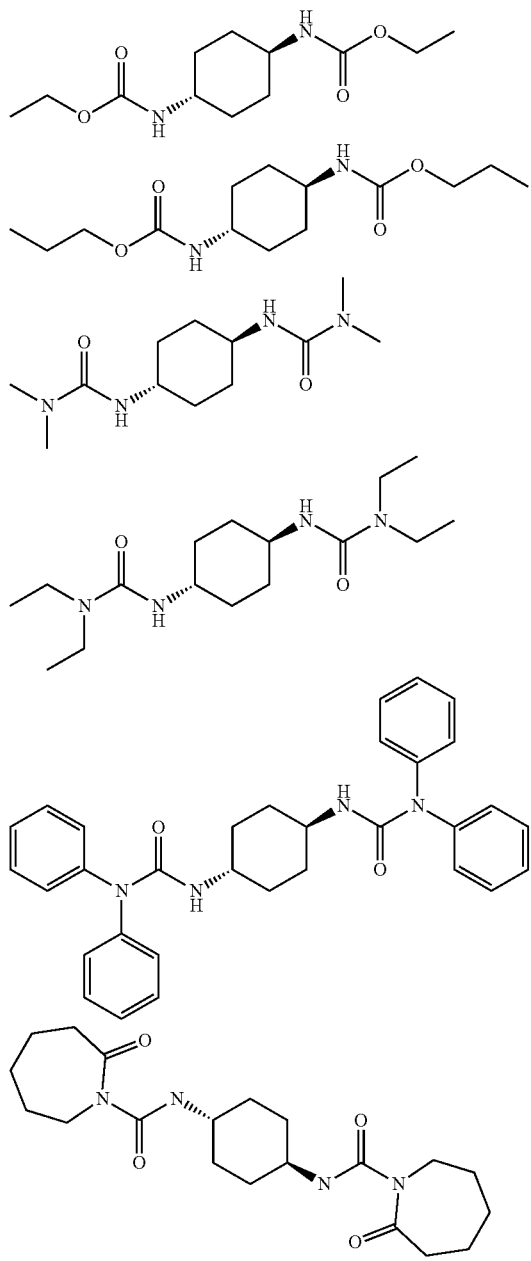

The compounds of formula (I) may be produced by the standard methods known in the literature or as described in the experimental part of this application.

For example compounds of formula (I) where $R_1$, $R_2$, $R_3$ and $R_4$ are identical may be produced in the manner shown in scheme 1 which follows:

Scheme 1:

For $R_1 = R_2 = R_3 = R_4$

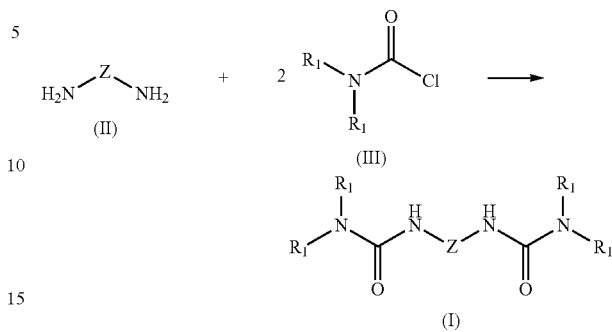

One diamine component of formula (II) reacts with two equivalents of carbamoyl chloride (III) to afford the compound of formula (I) in good yield. The reaction is typically performed in an organic solvent in the presence of a base, for example triethylamine. Suitable solvents are polar aprotic solvents, for example tetrahydrofuran.

The bisurea of formula (I) may alternatively be produced by reaction of a diisocyanate of formula (IV) with two equivalents of an amine of formula (V). The reaction is typically carried out in an organic solvent. Suitable solvents are polar aprotic solvents, for example tetrahydrofuran.

Scheme 2:

For $R_1 = R_2 = R_3 = R_4$

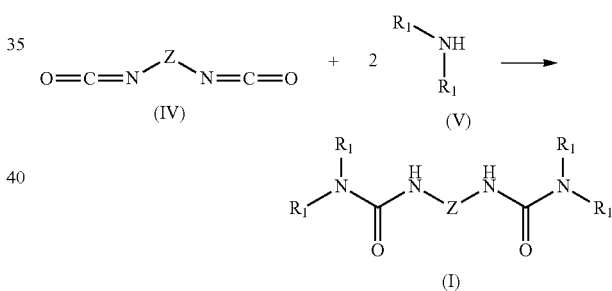

Compounds of formula (I) where $R_5$ and $R_6$ are identical may be produced in the manner shown in scheme 3 which follows:

Scheme 3:

For $R_5 = R_6$

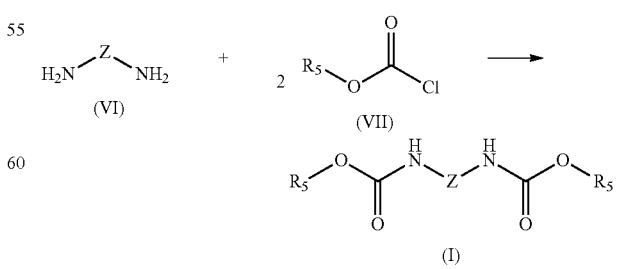

One diamine component of formula (VI) reacts with two equivalents of chloroformate (VII) to afford the compound of formula (I) in good yield. The reaction is typically performed in an organic solvent in the presence of a base, for example triethylamine. Suitable solvents are polar aprotic solvents, for example tetrahydrofuran.

The bisurea of formula (I) may alternatively be produced by reaction of a diisocyanate of formula (VIII) with two equivalents of an alcohol of formula (IX). The reaction is typically carried out in an organic solvent. Suitable solvents are polar aprotic solvents, for example tetrahydrofuran.

Scheme 4:

For $R_5 = R_6$

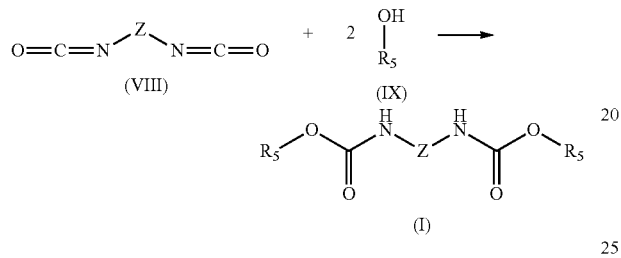

As component C) the molding compositions according to the invention may comprise 0 to 60 and preferably 0 to 50 wt % of further added substances.

As component C) the molding compositions may comprise elastomeric polymers (often also referred to as impact modifiers, elastomers or rubbers) in amounts of 0 to 40, preferably 1 to 30 and in particular to 2 to 20 wt %.

Very generally these are copolymers preferably constructed from at least two of the following monomers: ethylene, propylene, butadiene, isobutene, isoprene, chloroprene, vinyl acetate, styrene, acrylonitrile and acrylic or methacrylic esters having 1 to 18 carbon atoms in the alcohol component.

Such polymers are described, for example, in Houben-Weyl, Methoden der organischen Chemie, volume 14/1 (Georg-Thieme-Verlag, Stuttgart, 1961), pages 392 to 406 and in the monograph by C. B. Bucknall, "Toughened Plastics" (Applied Science Publishers, London, 1977).

Some preferred types of such elastomers are presented hereinbelow.

Preferred types of such elastomers are the so-called ethylene-propylene (EPM) and ethylene-propylene-diene (EPDM) rubbers.

EPM rubbers generally have virtually no double bonds left, while EPDM rubbers can have 1 to 20 double bonds/100 carbon atoms.

Examples of diene monomers for EPDM rubbers include conjugated dienes such as isoprene and butadiene and non-conjugated dienes having 5 to 25 carbon atoms, such as penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene, and alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo[5.2.1.0.2.6]-3,8-decadiene and mixtures thereof. Preference is given to hexa-1,5-diene, 5-ethylidenenorbornene and dicyclopentadiene. The diene content of the EPDM rubbers is preferably 0.5 to 50 and in particular 1 to 8 wt % based on the total weight of the rubber.

EPM/EPDM rubbers may preferably also be grafted with reactive carboxylic acids or derivatives thereof. Examples here include acrylic acid, methacrylic acid and derivatives thereof, for example glycidyl (meth)acrylate and maleic anhydride.

A further group of preferred rubbers are copolymers of ethylene with acrylic acid and/or methacrylic acid and/or esters of these acids. The rubbers may additionally comprise monomers comprising dicarboxylic acids such as maleic acid and fumaric acid or derivatives of these acids, for example esters and anhydrides, and/or monomers comprising epoxy groups. These monomers comprising dicarboxylic acid derivatives/epoxy groups are preferably incorporated into the rubber by addition to the monomer mixture of monomers which comprise dicarboxylic acids/epoxy groups and conform to the general formula I or II or III or IV.

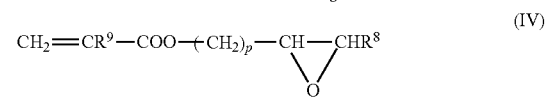

where $R^1$ to $R^9$ represent hydrogen or alkyl groups having 1 to 6 carbon atoms, m is an integer from 0 to 20, g is an integer from 0 to 10 and p is an integer from 0 to 5.

It is preferable when the radicals $R^1$ to $R^9$ represent hydrogen, m is 0 or 1 and g is 1. The corresponding compounds are maleic acid, fumaric acid, maleic anhydride, allyl glycidyl ether and vinyl glycidyl ether.

Preferred compounds of formulae I, II and IV are maleic acid, maleic anhydride and esters of acrylic acid and/or methacrylic acid which comprise epoxy groups, such as glycidyl acrylate, glycidyl methacrylate, and the esters with tertiary alcohols, such as t-butyl acrylate. Although the last-mentioned compounds have no free carboxyl groups, their behavior approaches that of the free acids and they are therefore described as monomers with latent carboxyl groups. The copolymers are advantageously composed of 50 to 98 wt % of ethylene, 0.1 to 20 wt % of monomers comprising epoxy groups and/or monomers comprising (meth)acrylic acid and/or anhydride groups, (meth)acrylic esters making up the remainder.

Particular preference is given to copolymers made of
50 to 98, and in particular 55 to 95 wt % of ethylene,
0.1 to 40, and in particular 0.3 to 20 wt % of glycidyl acrylate and/or glycidyl methacrylate, (meth)acrylic acid and/or maleic anhydride, and
1 to 45, and in particular 5 to 40 wt % of n-butyl acrylate and/or 2-ethylhexyl acrylate.

Further preferred esters of acrylic and/or methacrylic acid are the methyl, ethyl, propyl and i-/t-butyl esters.

It is additionally possible to employ vinyl esters and vinyl ethers as comonomers.

The above described ethylene copolymers may be produced by processes known per se, preferably by random copolymerization under high pressure and elevated temperature.

Corresponding processes are common knowledge.

Preferred elastomers also include emulsion polymers, the production of which is described, for example, by Blackley in the monograph "Emulsion Polymerization". The usable emulsifiers and catalysts are known per se.

It is possible in principle to employ elastomers having a homogeneous construction or else elastomers having a shell construction. The shell-like construction is determined by the sequence of addition of the individual monomers; the morphology of the polymers too is influenced by this sequence of addition.

Useful monomers for producing the rubber part of the elastomers include, as representative examples only, acrylates, for example n-butyl acrylate and 2-ethylhexyl acrylate, corresponding methacrylates, butadiene and isoprene and also mixtures thereof. These monomers may be copolymerized with further monomers, for example styrene, acrylonitrile, vinyl ethers and further acrylates or methacrylates such as methyl methacrylate, methyl acrylate, ethyl acrylate and propyl acrylate.

The soft or rubber phase (having a glass transition temperature of below 0° C.) of the elastomers may constitute the core, the outer envelope or an intermediate shell (for elastomers constructed from more than two shells); multishell elastomers may also have a plurality of shells composed of a rubber phase.

When, in addition to the rubber phase, the construction of the elastomer also involves one or more hard components (having glass transition temperatures of above 20° C.), these are generally produced by polymerization of styrene, acrylonitrile, methacrylonitrile, α-methylstyrene, p-methylstyrene, acrylic esters and methacrylic esters such as methyl acrylate, ethyl acrylate and methyl methacrylate as principal monomers. Smaller proportions of further comonomers may additionally be employed here too.

It has proved advantageous in a number of cases to employ emulsion polymers having reactive groups at the surface. Examples of such groups include epoxy, carboxyl, latent carboxyl, amino or amide groups and also functional groups that may be introduced by additionally employing monomers of general formula

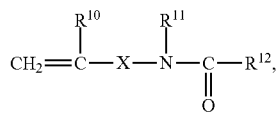

where the substituents may have the following meanings:
$R^{10}$ hydrogen or a $C_1$ to $C_4$ alkyl group,
$R^{11}$ hydrogen, a $C_1$ to $C_8$ alkyl group or an aryl group, in particular phenyl,
$R^{12}$ hydrogen, a $C_1$ to $C_{10}$ alkyl group, a $C_6$ to $C_{12}$ aryl group or $-OR^{13}$
$R^{13}$ a $C_1$ to $C_8$ alkyl group or $C_6$ to $C_{12}$ aryl group, which may optionally be substituted with oxygen- or nitrogen-containing groups,
X a chemical bond, a $C_1$ to $C_{10}$ alkylene or $C_6$-$C_{12}$ arylene group
or

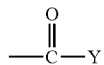

Y O—Z or NH—Z and
Z a $C_1$ to $C_{10}$ alkylene or $C_6$ to $C_{12}$ arylene group.

The graft monomers described in EP-A 208 187 are also suitable for introducing reactive groups at the surface.

Further examples include acrylamide, methacrylamide and substituted esters of acrylic acid or methacrylic acid such as (N-t-butylamino)ethyl methacrylate, (N,N-dimethylamino)ethyl acrylate, (N,N-dimethylamino)methyl acrylate and (N,N-diethylamino)ethyl acrylate.

The particles of the rubber phase and may moreover also be in a crosslinked state. Examples of crosslinking monomers include 1,3-butadiene, divinylbenzene, diallyl phthalate and dihydrodicyclopentadienyl acrylate and also the compounds described in EP-A 50 265.

It is also possible to employ so-called graft-linking monomers, i.e. monomers having two or more polymerizable double bonds which react at different rates during the polymerization. It is preferable to employ compounds where at least one reactive group polymerizes at about the same rate as the other monomers, while the other reactive group (or reactive groups), for example, polymerize(s) markedly more slowly. The different polymerization rates give rise to a certain proportion of unsaturated double bonds in the rubber. When a further phase is subsequently grafted onto such a rubber, at least some of the double bonds present in the rubber react with the graft monomers to form chemical bonds, i.e., the graft superstrate phase has at least some degree of chemical bonding to the graft substrate.

Examples of such graft-linking monomers include monomers comprising allyl groups, in particular allyl esters of ethylenically unsaturated carboxylic acids such as allyl acrylate, allyl methacrylate, diallyl maleate, diallyl fumarate, diallyl itaconate or the corresponding monoallyl compounds of these dicarboxylic acids. There are additionally a great many further suitable graft-linking monomers; see U.S. Pat. No. 4,148,846 for example for further details.

These crosslinking monomers are generally present in the impact-modifying polymer in proportions of up to 5 wt % and preferably not more than 3 wt % based on the impact-modifying polymer.

A number of preferred emulsion polymers are listed below. The list first mentions graft polymers having a core and at least one outer shell, which have the following construction:

| Type | Monomers for core | Monomers for envelope |
|---|---|---|
| I | 1,3-butadiene, isoprene, n-butyl acrylate, ethylhexyl acrylate or mixtures thereof | styrene, acrylonitrile, methyl methacrylate |
| II | as I, but additionally employing crosslinkers | as I |
| III | as I or II | n-butyl acrylate, ethyl acrylate, methyl acrylate, 1,3-butadiene, isoprene, ethylhexyl acrylate |

-continued

| Type | Monomers for core | Monomers for envelope |
|---|---|---|
| IV | as I or II | as I or III, but additionally employing monomers having reactive groups as described herein |
| V | styrene, acrylonitrile, methyl methacrylate or mixtures thereof | first envelope made of monomers as described under I and II for the core, second envelope as described under I or IV for the envelope |

Instead of graft polymers having a multishell construction, it is also possible to use homogeneous, i.e., single-shell, elastomers made of 1,3-butadiene, isoprene and n-butyl acrylate or copolymers thereof. These products too may be prepared by additionally employing crosslinking monomers or monomers having reactive groups.

Examples of preferred emulsion polymers include n-butyl acrylate-(meth)acrylic acid copolymers, n-butyl acrylate-glycidyl acrylate or n-butyl acrylate-glycidyl methacrylate copolymers, graft polymers having an inner core made of n-butyl acrylate or based on butadiene and an outer envelope of the abovementioned copolymers, and copolymers of ethylene with comonomers which provide reactive groups.

The elastomers described may also be prepared by other customary methods, for example by suspension polymerization.

Silicone rubbers as described in DE-A 37 25 576, EP-A 235 690, DE-A 38 00 603 and EP-A 319 290 are likewise preferred.

Particularly preferred rubbers C) are ethylene copolymers, as described hereinabove, which comprise functional monomers, wherein the functional monomers are selected from the group of carboxylic acid, carboxylic anhydride, carboxylic ester, carboxylic amide, carboxylic imide, amino, hydroxyl, epoxide, urethane or oxazoline groups or mixtures thereof.

The functional groups are generally present in a proportion of 0.1 to 20, preferably 0.2 to 10 and in particular 0.3 to 7 wt % based on 100 wt % of C).

Particularly preferred monomers are constructed from an ethylenically unsaturated mono- or dicarboxylic acid or from a functional derivative of such an acid.

All primary, secondary and tertiary $C_1$-$C_{18}$ alkyl esters of acrylic acid or methacrylic acid are suitable in principle but preference is given to esters having 1-12 carbon atoms, in particular having 2-10 carbon atoms.

Examples thereof include methyl, ethyl, propyl, n-butyl, i-butyl, t-butyl, 2-ethylhexyl, octyl and decyl acrylates and the corresponding esters of methacrylic acid. Of these, n-butyl acrylate and 2-ethylhexyl acrylate are particularly preferred.

In place of the esters or in addition thereto, the olefin polymers may also comprise acid-functional and or latently acid-functional monomers of ethylenically unsaturated mono or dicarboxylic acids or monomers comprising epoxy groups.

Further examples of monomers include acrylic acid, methacrylic acid, tertiary alkyl esters of these acids, in particular tert-butyl acrylate and dicarboxylic acids such as maleic acid and fumaric acid or derivatives of these acids and also the monoesters thereof.

Latently acid-functional monomers is to be understood as meaning compounds forming free acid groups under the polymerization conditions/during incorporation of the olefin polymers into the molding compositions. Examples thereof include anhydrides of dicarboxylic acids having up to 20 carbon atoms, in particular maleic anhydride and tertiary $C_1$-$C_{12}$ alkyl esters of the abovementioned acids, in particular tert-butyl acrylate and tert-butyl methacrylate.

The acid-functional/latently acid-functional monomers and the monomers comprising epoxy groups are preferably incorporated into the olefin polymers by addition of compounds of general formulae I-IV to the monomer mixture.

The melt flow index of the ethylene copolymers is generally in the range from 1 to 80 g/10 min (measured at 190° C. under a load of 2.16 kg).

The molecular weight of these ethylene-α-olefin copolymers is between 10 000 and 500 000 g/mol, preferably between 15 000 and 400 000 g/mol (Mn, determined by GPC in 1,2,4-trichlorobenzene with PS calibration).

One particular embodiment employs ethylene-α-olefin copolymers produced using so-called "single site catalysts". See U.S. Pat. No. 5,272,236 for further details. In this case the ethylene-α-olefin copolymers have a molecular weight distribution of less than 4, preferably less than 3.5, which is narrow for polyolefins.

Preferably employed commercially available products are Exxelor® VA 1801 or 1803, Kraton® G 1901 FX or Fusabond® N NM493 D or Fusabond® A560 from Exxon, Kraton and DuPont as well as Tafmer® MH 7010 from Mitsui.

It will be appreciated that it is also possible to employ mixtures of the rubber types cited hereinabove.

As component C) the molding compositions according to the invention may comprise up to 60 and preferably up to 50 wt % of further added substances.

Useful fibrous or particulate fillers C) include carbon fibers, glass fibers, glass beads, amorphous silica, calcium silicate, calcium metasilicate, magnesium carbonate, kaolin, chalk, pulverulent quartz, mica, barium sulfate and feldspar, and these may be employed in amounts of from 1 to 50 wt %, in particular 5 to 40 and preferably 10 to 40 wt %.

Preferred fibrous fillers include carbon fibers, aramid fibers, and potassium titanate fibers, particular preference being given to glass fibers in the form of E-glass. These may be employed as rovings or chopped glass in the commercially available forms.

The fibrous fillers may comprise a silane compound surface-pretreatment to improve compatibility with the thermoplastic.

Suitable silane compounds are those of general formula

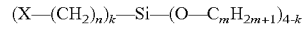

in which the substituents have the following meaning:

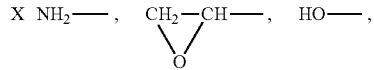

n an integer from 2 to 10, preferably 3 to 4
m an integer from 1 to 5, preferably 1 to 2
k an integer from 1 to 3, preferably 1.

Preferred silane compounds are aminopropyltrimethoxysilane, aminobutyltrimethoxysilane, aminopropyltriethoxysilane, aminobutyltriethoxysilane and also the corresponding silanes which comprise as substituent X a glycidyl group.

The silane compounds are generally used for surface coating in amounts of from 0.01 to 2, preferably 0.025 to 1.0 and in particular 0.05 to 0.5 wt % (based on C)).

Acicular mineral fillers are also suitable.

In the context of the invention acicular mineral fillers is to be understood as meaning mineral fillers of strong acicular character. Wollastonite is cited as an example. The mineral preferably has an L/D (length/diameter)-ratio of from 8:1 to 35:1, preferably 8:1 to 11:1. The mineral filler may optionally have been pretreated with the abovementioned silane compounds but pretreatment is not an absolute requirement.

Useful further fillers include kaolin, calcined kaolin, wollastonite, talc and chalk and also lamellar or acicular nanofillers, preferably in amounts between 0.1 and 10%. Preferably employed therefor are böhmite, bentonite, montmorillonite, vermiculite and hectorite. To obtain good compatibility of the lamellar nanofillers with the organic binder, the lamellar nanofillers are subjected to prior art organic modification. Addition of the lamellar or acicular nanofillers to the nanocomposites of the invention further enhances mechanical strength.

As component C) the molding compositions according to the invention may comprise 0.05 to 3, preferably 0.1 to 1.5 and in particular 0.1 to 1 wt % of a lubricant.

Preference is given to aluminum salts, alkali metal salts, alkaline earth metal salts or esters or amides of fatty acids having 10 to 44 carbon atoms, preferably having 12 to 44 carbon atoms. The metal ions are preferably alkaline earth metal and aluminum, particular preference being given to calcium or magnesium.

Preferred metal salts are calcium stearate and calcium montanate and also aluminum stearate.

It is also possible to employ mixtures of various salts in any desired mixture ratio.

The carboxylic acids may be mono- or dibasic. Examples include pelargonic acid, palmitic acid, lauric acid, margaric acid, dodecanedioic acid, behenic acid, and particularly preferably stearic acid, capric acid and montanic acid (a mixture of fatty acids having 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, particular preference being given to glycerol and pentaerythritol.

The aliphatic amines may be mono- to trifunctional. Examples thereof are stearylamine, ethylenediamine, propylenediamine, hexamethylenediamine, di(6-aminohexyl) amine, particular preference being given to ethylenediamine and hexamethylenediamine. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of various esters or amides or esters combined with amides, in which case the mixing ratio is as desired.

Suitable as sterically hindered phenols C) are in principle all compounds having a phenolic structure and having at least one sterically demanding group on the phenolic ring.

Consideration is preferably given, for example, to compounds of formula

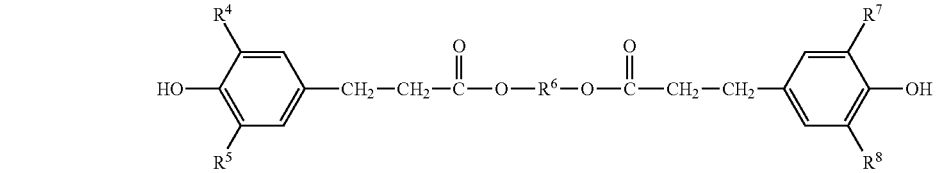

where
$R^1$ and $R^2$ represent an alkyl group, a substituted alkyl group or a substituted triazole group, where the radicals $R^1$ and $R^2$ may be identical or different and $R^3$ represents an alkyl group, a substituted alkyl group, an alkoxy group or a substituted amino group.

Antioxidants of the cited type are described in DE-A 27 02 661 (U.S. Pat. No. 4,360,617) for example. A further group of preferred sterically hindered phenols are derived from substituted benzenecarboxylic acids, in particular from substituted benzenepropionic acids.

Particularly preferred compounds from this class are compounds of formula

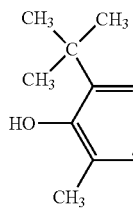

where $R^4$, $R^5$, $R^7$ and $R^8$ independently of one another represent $C_1$-$C_8$ alkyl groups which may themselves be substituted (at least one of them is a sterically demanding group) and $R^6$ represents a divalent aliphatic radical having 1 to 10 carbon atoms which may also have C—O bonds in the main chain.

Preferred compounds conforming to this formula are

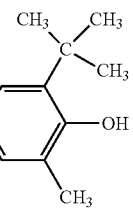

(Irganox® 245 from BASF SE)

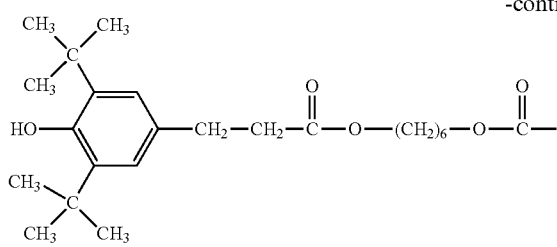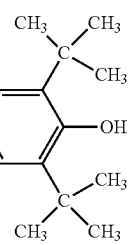

(Irganox® 259 from BASF SE)

Examples of altogether sterically hindered phenols include:
2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phospha-bicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and are therefore employed with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate] and N,N'-hexamethylenebis-3,5-di-tert-butyl-4-hydroxyhydro-cinnamide (Irganox® 1098) and the above described Irganox® 245 from BASF SE which is particularly suitable.

The antioxidants C) which may be employed individually or as mixtures are present in an amount of from 0.05 up to 3 wt %, preferably from 0.1 to 1.5 wt % and in particular 0.1 to 1 wt % based on the total weight of the molding compositions A) to C).

In some cases sterically hindered phenols having not more than one sterically hindered group in the position ortho to the phenolic hydroxyl group have proven particularly advantageous, in particular when determining color stability during storage in diffuse light over relatively long periods.

As component C) the molding compositions according to the invention may comprise 0.05 to 5, preferably 0.1 to 2 and in particular 0.25 to 1.5 wt % of a nigrosine.

The term nigrosines is generally understood to mean a group of black or gray phenazine dyes (azine dyes) in various embodiments (water-soluble, liposoluble, gasoline-soluble) which is related to the indulines and used in wool dyeing and printing, in the black coloring of silks, for dyeing leather, shoe polishes, varnishes, plastics, heat-cured coatings, inks and the like, and also as microscopy dyes.

Nigrosines are obtained industrially by heating nitrobenzene, aniline and aniline hydrochoride with metallic iron and FeCl₃ (name derives from the Latin niger=black).

The component C) may be used as the free base or else as a salt (for example hydrochloride).

For further details concerning nigrosines see, for example, the electronic lexicon Rompp Online, Version 2.8, Thieme-Verlag Stuttgart, 2006, under "Nigrosin".

As component C) the molding compositions according to the invention may comprise 0 to 20, preferably 1 to 15 and in particular 5 to 15 wt % of red phosphorus or/and a nitrogen-containing flame retardant, preferably a melamine compound.

Suitable compounds (often also described as salts or adducts) are melamine sulfate, melamine, melamine borate, oxalate, phosphate prim., phosphate sec. and pyrophosphate sec., melamine neopentyl glycol borate, and polymeric melamine phosphate (CAS No. 56386-64-2 and 218768-84-4).

As component C) the thermoplastic molding compositions according to the invention may comprise customary processing aids such as stabilizers, oxidation retarders, agents to counteract thermal degradation and ultraviolet light degradation, lubricants and release agents, colorants such as dyes and pigments, nucleating agents, plasticizers, etc.

Examples of oxidation retarders and heat stabilizers include sterically hindered phenols and/or phosphites and amines (e.g. TAD), hydroquinones, aromatic secondary amines such as diphenylamines, various substituted representatives of these groups and mixtures thereof in concentrations of up to 1 wt % based on the weight of the thermoplastic molding compositions.

Useful UV stabilizers which are generally used in amounts of up to 2 wt % based on the molding composition include various substituted resorcinols, salicylates, benzotriazoles, and benzophenones.

Colorants which may be added include inorganic pigments, such as titanium dioxide, ultramarine blue, iron oxide, and carbon black, also organic pigments, such as phthalocyanines, quinacridones, and perylenes, and also dyes such as anthraquinones.

Nucleating agents which may be employed include sodium phenylphosphinate, aluminum oxide, silicon dioxide and preferably talc.

The thermoplastic molding compositions according to the invention may be prepared by processes known per se, by mixing the starting components in customary mixing apparatuses, such as screw extruders, Brabender mixers or Banbury mixers, and subsequently extruding the resulting mixture. After extrusion, the extrudate may be cooled and comminuted. It is also possible to premix individual components and then add the remaining starting materials individually and/or likewise in the form of a mixture. The mixing temperatures are generally from 230° C. to 320° C.

In a further preferred procedure, components B) and optionally C) may be mixed with a prepolymer, formulated and pelletized. The pellets obtained are then condensed to the desired viscosity either continuously or batchwise under inert gas in the solid phase at a temperature below the melting point of the component A).

The molding compositions employable in accordance with the invention are suitable for producing molded articles of any type having improved (laser) transparency and/or reduced cloudiness. These molding compositions have at least one of the following advantages:
the haze value is at least 10% lower compared to a reference polymer composition without the component B), measured according to ASTM D1003 (for a test specimen thickness of 1.3 mm);

the clarity value is at least 10% higher compared to a reference polymer composition without the component B), measured according to ASTM D1003 (for a test specimen thickness of 1.3 mm);

the laser transparency is at least 1% higher compared to a reference polymer composition without the component B), measured at 1064 nm (for a test specimen thickness of 1.3 mm).

The term "haze" used here is defined as the percentage of transmitted light which on passing through a test specimen (sheet) deviates from the incident light by more than 2.5°. Haze is determined according to ASTM D1003. The molding compositions employable in accordance with the invention have a haze which is at least 10% lower, particularly preferably 15% lower and in particular 20% lower compared to a reference polymer composition without the component B), measured at a test specimen thickness (sheet) of 1.3 mm.

The term "clarity" used here is defined as the percentage of transmitted light which on passing through a test specimen (sheet) deviates from the incident light by less than 2.5° on average. Clarity is determined according to ASTM D1003. The molding compositions employable in accordance with the invention have a clarity which is at least 10% higher, particularly preferably 15% higher and in particular 20% higher compared to a reference polymer composition without the component B), measured at a test specimen thickness (sheet) of 1.3 mm.

The molding compositions employable in accordance with the invention have a laser transparency at least 1% higher, preferably 3% higher, particularly preferably 5% higher and in particular 10% higher compared to a reference polymer composition without the component B), measured at a test specimen thickness (sheet) of 1.3 mm.

Laser transparency at a wavelength of 1064 nm was determined by thermoelectric power measurement. The measurement geometry was as follows:

A reference beam having a power of 1 watt was split-off at an angle of 90° from a laser beam (diode-pumped Nd-YAG laser with a wavelength of 1064 nm, FOBA DP50) having a total power of 2 watts using a beam splitter (SQ2 non-polarizing beam splitter from Laseroptik GmbH). Said reference beam was incident upon the reference sensor. The portion of the original beam passing through the beam splitter constituted the measuring beam which likewise had a power of 1 watt. Said measuring beam was focused to a focal diameter of 0.18 μm via a mode filter (5.0) behind the beam splitter. The laser transparency (LT) measurement sensor was positioned at a distance of 80 mm below the focus. The test sheet was positioned 2 mm above the LT measurement sensor. The total measurement duration was 30 s, the measurement result being determined during the final 5 s. The signals from the reference sensor and measurement sensor were captured simultaneously. Measurement commenced simultaneously with insertion of the sample.

Transmission and accordingly laser transparency were calculated using the formula: $LT=(signal(\text{measurement sensor})/signal(\text{reference sensor}))\times 100\%$. This manner of measurement ensured that variations in the laser system and subjective reading errors were excluded.

Such laser-transparent molded articles are employed in accordance with invention for producing molded articles by laser transmission welding processes.

It is generally possible to use molded articles made of any laser-absorbent material as the laser-absorbent molding. Examples include composites, thermosets or preferred molded articles made of distinct thermoplastic molding compositions. Suitable thermoplastic molding compositions are molding compositions having sufficient laser absorption in the wavelength range employed. Suitable thermoplastic molding compositions may, for example, preferably be thermoplastics which are laser-absorbent due to addition of inorganic pigments such as, for example, carbon black and/or due to addition of organic pigments or other additives. Suitable organic pigments for achieving laser absorption are, for example, preferably IR-absorbent organic compounds as are described in DE 199 16 104 A1 for example.

The invention further provides molded articles and/or combinations of moldings to which moldings according to the invention are connected by laser transmission welding.

Moldings according to the invention are outstandingly suitable for attaching in permanent and stable fashion to laser-absorbent moldings by the laser transmission welding process. They are therefore particularly suitable for materials for covers, housings, accessory parts, sensors, for applications in, for example, the automotive, electronics, telecommunications, information technology, computer, household, sports, medical, or entertainment sectors.

EXAMPLES

The following components were employed:
Component A
Polyamide 6 having a viscosity number VN of 150 ml/g, measured as a 0.5 wt % solution in 96 wt % of sulfuric acid at 25° C. in accordance with ISO 307 (Ultramid® B27 from BASF SE was employed.)
Components B

| | | |
|---|---|---|
| B1/V | N,N''-(methylenedi-4,1-cyclohexanediylbisurea; (CAS Registry Number 857476-67-6) |
| B2/V | N,N''-[1,3-cyclohexanediylbis(methylene)]bisurea; (CAS Registry Number 392715-67-2) |
| B3 | diethyl N,N'-trans-1,4-cyclohexanediyldicarbamate; (CAS Registry Number 68532-93-4) |
| B4 | dipropyl N,N'-trans-1,4-cyclohexanediyldicarbamate |
| B5 | trans-1,4-cyclohexanediylbis(3,3-dimethylurea) |
| B6 | trans-1,4-cyclohexanediylbis(3,3-diethylurea); (CAS Registry Number 68533-00-6) |
| B7 | trans-1,4-cyclohexanediylbis(3,3-diphenylurea) |
| B8 | trans-N,N'-1,4-cyclohexanediylbis[hexahydro-2-oxo-1H-azepine-1-carboxamide] |

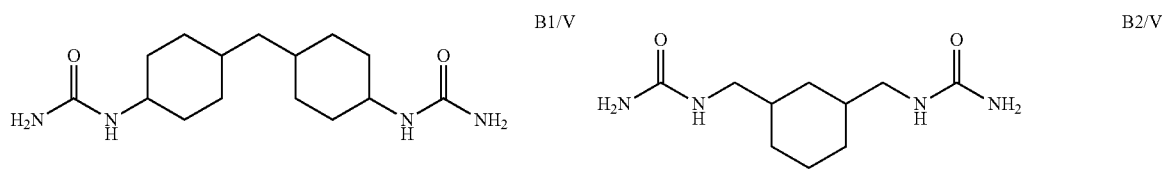

B3 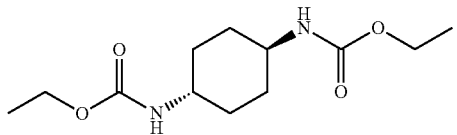

B4 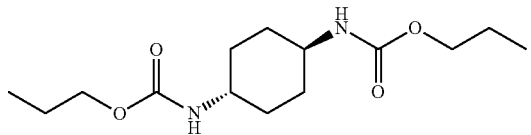

B5 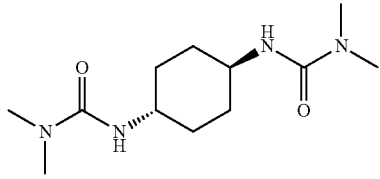

B6 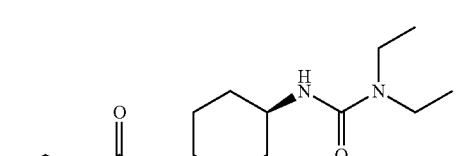

B7 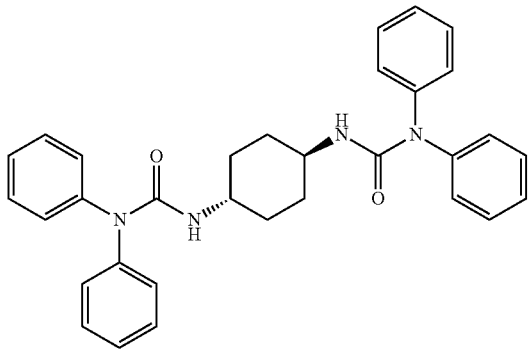

B8 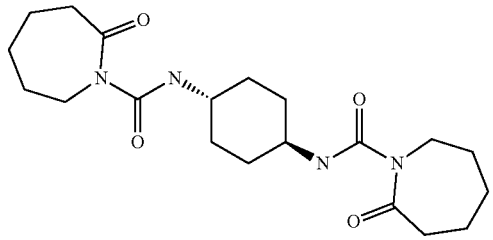

B9V 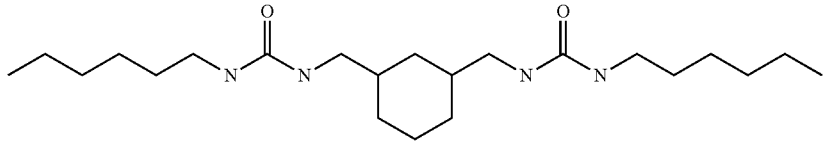

Comparison: WO 2013/139802

Synthesis of the Compounds of Formula (I)

N,N"-(Methylenedi-4,1-cyclohexanediyl)bisurea (Component B1/V)

4,4'-Diaminodicyclohexylmethane (147.3 g, 700 mmol) were dissolved in 1200 ml of water at 80° C. and adjusted to pH 6 with 30% hydrochloric acid. The resulting mixture was then cooled to room temperature and potassium cyanate (116 g, 1430 mmol) was added slowly with stirring. The mixture was heated to 90° C. and stirred at this temperature for 2 h. Once the mixture had been cooled to room temperature the white precipitate was filtered off and afterwashed with water. The white solid thus obtained was dried under vacuum at 80° C.

N,N"-[1,3-Cyclohexanediylbis(methylene)]bisurea (Component B2/V)

1,3-Bis(aminomethyl)cyclohexane (99.54 g, 700 mmol) were dissolved in 1000 ml of water at 80° C. and adjusted to pH 6 with 30% hydrochloric acid. The resulting mixture was then cooled to room temperature and potassium cyanate (116 g, 1430 mmol) was added slowly with stirring. The mixture was heated to 90° C. and stirred at this temperature for 2 h. Once the mixture had been cooled to 5° C. a white precipitate was formed over 12 hours and filtered off. The white solid thus obtained was dried under vacuum at 80° C.

Diethyl N,N'-trans-1,4-cyclohexanediyldicarbamate (Component B3)

1,4-trans-Diaminocyclohexane (10 g, 88 mmol) was dissolved in dry THF (300 ml) and triethylamine (35 g, 345 mmol) was added with stirring under an inert atmosphere. The resulting mixture was then cooled to 0° C. and ethyl chloroformate (19.2 g, 177 mmol) was added slowly with stirring. The resulting mixture was heated to reflux and stirred for 24 hours. 200 ml of water were then added. The precipitate was filtered off and washed with THF. The white solid thus obtained was dried under vacuum at 80° C.

The compounds B4 were produced analogously using propyl chloroformate.

trans-1,4-Cyclohexanediylbis(3,3-dimethylurea) (Component B5)

1,4-trans-Diaminocyclohexane (10 g, 88 mmol) was dissolved in dry THF (300 ml) and triethylamine (35 g, 345 mmol) was added with stirring under an inert atmosphere. The resulting mixture was then cooled to 0° C. and dimethylcarbamoyl chloride (19.0 g, 177 mmol) was added slowly with stirring. The resulting mixture was heated to reflux and stirred for 24 hours. 200 ml of water were then added. The precipitate was filtered off and washed with THF. The white solid thus obtained was dried under vacuum at 80° C.

The compounds B6 and B7 were produced analogously using diethylcarbamoyl chloride and diphenylcarbamoyl chloride respectively.

trans-N,N'-1,4-Cyclohexanediylbis[hexahydro-2-oxo-1H-azepine-1-carboxamide] (Component B8)

1,4-trans-Cyclohexyl diisocyanate (10 g, 60 mmol) is dissolved in dry THF (300 ml). Caprolactam (14.7 g, 130 mmol) is then added slowly with stirring. The resulting mixture is heated to reflux and stirred for 24 h. The precipitate is filtered off and washed with THF. The white solid thus obtained is dried under vacuum at 80° C.

Processing:

Compounding—DSM:

The polyamide pellets and the respective components B (1 wt %) were weighed into a glass flask and subsequently compounded in a conical twin-screw extruder (DSM Xplore, 15 cc) under nitrogen. The pure polyamide was processed in the same way to obtain the reference sample. The following parameters were used:

Residence time: 3 min.

Barrel temperature: 260° C.

Melt temperature: 240° C.-245° C.

Speed of rotation: 200 rpm

Injection Molding—DSM:

The compounded polymers were injection molded using a 10 cc DSM micro injection molding apparatus. To this end the molten compound was filled directly into the cylinder of the injection molding machine under nitrogen. The melt was subsequently injected into a polished rectangular mold of dimensions (30 mm×30 mm×1.27 mm). The following parameters were used:

Mold: plaque, polished; 30 mm×30 mm×1.27 mm

Mold temperature: 70° C.

Cylinder temperature: 260° C.

Injection pressure: 10-12 bar

Measurement Methods:

Polymer Crystallization Temperature

The crystallization behavior of the polymer mixtures is determined by differential scanning calorimetry (DSC) in a manner known per se (ISO 11357-2:2013). The determination was performed under nitrogen in open aluminum crucibles at a heating rate and cooling rate of 20 K/min. After the first heating procedure the sample is kept in the melt for 5 min to delete the thermal history of the polymer. The DSC measurement is advantageously repeated once or twice on the same sample to ensure that the respective polyamide has a defined thermal history. The crystallization temperature Tk were determined in accordance with DIN EN ISO 11357-3. The crystallization temperature Tk is the exothermic peak minimum of the DSC curve in the first cooling operation at 20 K/min after a defined thermal history.

Optical Characterization (Haze, Clarity):

Haze, clarity, and transmission were measured with a haze gard plus tester (BYK-Gardner®, illumination CIE-E) at room temperature. Measurement was performed in accordance with ASTM D-1003. The haze and clarity values were measured 24 to 48 h after injection molding.

TABLE 1

Composition of the compounds

| Examples | A (wt %) | B1/V (%) | B2/V (%) | B3 (%) | B4 (%) | B5 (%) | B6 (%) | B7 (%) | B8 (%) | B9V (%) |
|---|---|---|---|---|---|---|---|---|---|---|
| 1V | 100 | 0 | 0 | 0 | 0 | 0 | 0 | 0 | 0 | 0 |
| 2V | 99 | 1 | 0 | 0 | 0 | 0 | 0 | 0 | 0 | 0 |
| 3V | 99 | 0 | 1 | 0 | 0 | 0 | 0 | 0 | 0 | 0 |
| 4 | 99 | 0 | 0 | 1 | 0 | 0 | 0 | 0 | 0 | 0 |
| 5 | 99 | 0 | 0 | 0 | 1 | 0 | 0 | 0 | 0 | 0 |
| 6 | 99 | 0 | 0 | 0 | 0 | 1 | 0 | 0 | 0 | 0 |
| 7 | 99 | 0 | 0 | 0 | 0 | 0 | 1 | 0 | 0 | 0 |
| 8 | 99 | 0 | 0 | 0 | 0 | 0 | 0 | 1 | 0 | 0 |
| 9 | 99 | 0 | 0 | 0 | 0 | 0 | 0 | 0 | 1 | 0 |
| 10V | 99 | 0 | 0 | 0 | 0 | 0 | 0 | 0 | 0 | 1 |

TABLE 2

| Examples | Haze [%] | Clarity [%] |
|---|---|---|
| 1V | 100 | 64 |
| 2V | 100 | 58 |
| 3V | 95 | 70 |
| 4 | 57 | 97 |
| 5 | 64 | 97 |
| 6 | 59 | 97 |
| 7 | 44 | 98 |
| 8 | 59 | 98 |
| 9 | 21 | 97 |
| 10V | 100 | 54 |

The invention claimed is:

1. A method for producing molded articles comprising the use of a thermoplastic molding composition comprising
A) 30 to 99 wt % of a thermoplastic polyamide,
B) 0.05 to 10 wt % of a compound of formula I

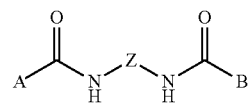

where

A) represents a

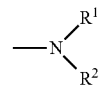

and
B) represents a

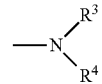

or A represents an —OR$^5$ radical and B represents an —OR$^6$ radical
and
Z represents unsubstituted or substituted cycloalkylene radicals having 3 to 17 carbon atoms or substituted or unsubstituted aromatic radicals having 6 to 20 carbon atoms,
R$^1$ to R$^6$ independently of one another represent linear C1-C14 alkyl radicals, branched C3 to C12 alkyl radicals, unsubstituted or substituted C3-C14 cycloalkyl radicals, unsubstituted or substituted aromatic radicals having 6 to 20 carbon atoms or acetyl radicals, $R^1$ and $R^2$ and also $R^3$ and $R^4$, together with the nitrogen as a linking member, form a heteroalkylene radical which bears one keto group as substituent, C) 0 to 60 wt % of further additives, wherein the weight percentages for the components A) to C) sum to 100%, the molded articles having improved haze (measured according to ASTM D1003) and/or improved clarity (measured according to ASTM D1003), wherein the molded article has a haze value, measured according to ASTM D1003, which is at least 10% lower compared to a reference polymer composition without the component B), measured at a test specimen thickness (sheet) of 1.3 mm, and/or wherein the molded article has a clarity value, measured according to ASTM D1003, which is at least 10% higher compared to a reference polymer composition without the component B), measured at a test specimen thickness (sheet) of 1.3 mm.

2. The method according to claim 1, wherein the molding compositions are constructed from A) 30 to 99 wt %,
B) 0.5 to 10 wt %, and
C) 0 to 60 wt %.

3. The method according to claim 1 in which the radicals $R^1$ and $R^2$, and also $R^3$ and $R^4$ as well as $R^5$ and $R^6$ are identical.

4. The method according to claim 1 in which the radicals $R^1$ to $R^6$ are independently of one another methyl, ethyl, n-propyl, phenyl, or cyclohexyl.

5. The method according to claim 1, wherein the component B is constructed from the following compounds or mixtures thereof:

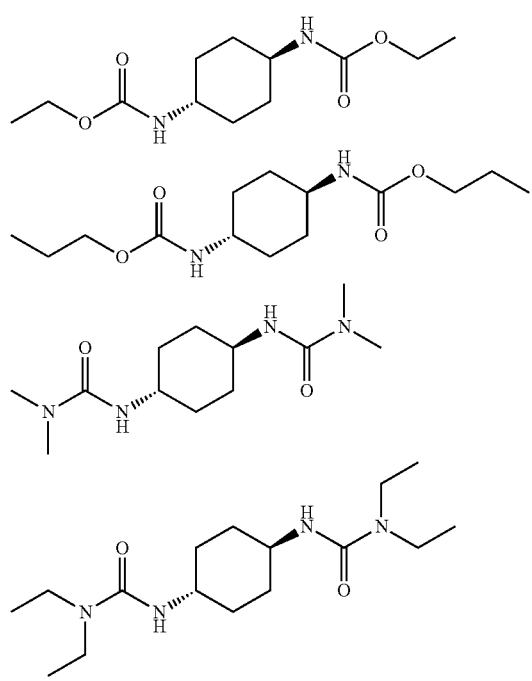

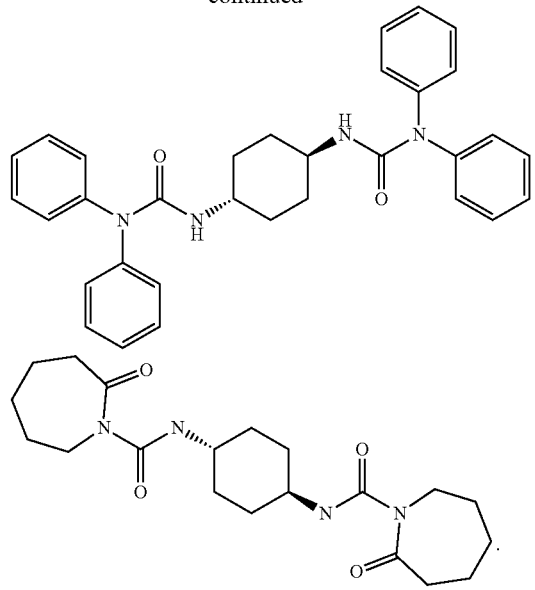

6. The method according to claim 1, wherein Z represents a 1,4-trans-cyclohexylene radical.

7. The method according to claim 1, wherein the thermoplastic polyamide is polyhexamethylene adipamide, polyhexamethylene sebacamide, polycaprolactam, or copolyamide 6/66.

8. The method according to claim 1 for producing molded articles by laser transmission welding.

9. A molded article obtained according to claim 1 for applications in the electrical, electronics, telecommunications, information technology, computer, sports, medical, automotive, or entertainment sectors.

10. A thermoplastic molding composition comprising

A) 30 to 99 wt % of a thermoplastic polyamide,
B) 0.05 to 10 wt % of a compound of formula I

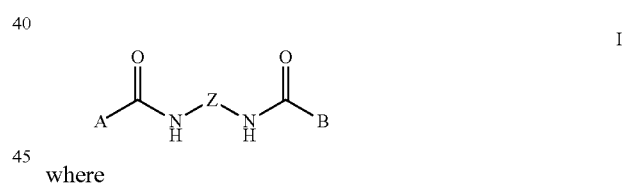

where

A) represents a
and
B) represents a

or A represents an —$OR^5$ radical and B represents an —$OR^6$ radical
and

Z represents unsubstituted or substituted cycloalkylene radicals having 3 to 17 carbon atoms or substituted or unsubstituted aromatic radicals having 6 to 20 carbon atoms, $R^1$ to $R^6$ independently of one another represent linear C1-C14 alkyl radicals, branched C3 to C12 alkyl radicals, unsubstituted or substituted C3-C14 cycloalkyl radicals, unsubstituted or substituted aromatic radicals having 6 to 20 carbon atoms or acetyl radicals, $R^1$ and $R^2$ and also $R^3$ and $R^4$, together with the nitrogen as a linking member, form a heteroalkylene radical which bears one keto group as substituent, C) 0 to 60 wt % of further additives, wherein the weight percentages for the components A) to C) sum to 100.

* * * * *